US011711571B2

(12) United States Patent
Amer et al.

(10) Patent No.: US 11,711,571 B2
(45) Date of Patent: Jul. 25, 2023

(54) CLIENT-SIDE OFFLOAD OF GRAPHICS EFFECTS PROCESSING

(71) Applicants: ATI TECHNOLOGIES ULC, Markham (CA); ADVANCED MICRO DEVICES, INC., Santa Clara, CA (US)

(72) Inventors: Ihab Amer, Markham (CA); Guennadi Riguer, Markham (CA); Thomas Perry, Markham (CA); Mehdi Saeedi, Markham (CA); Gabor Sines, Markham (CA); Yang Liu, Markham (CA)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/193,484

(22) Filed: Mar. 5, 2021

(65) Prior Publication Data
US 2021/0281912 A1    Sep. 9, 2021

Related U.S. Application Data

(60) Provisional application No. 62/985,924, filed on Mar. 6, 2020.

(51) Int. Cl.
*H04N 21/44* (2011.01)
*H04N 21/438* (2011.01)
(Continued)

(52) U.S. Cl.
CPC ... *H04N 21/44012* (2013.01); *H04N 21/4307* (2013.01); *H04N 21/438* (2013.01); *H04N 21/4318* (2013.01); *H04N 21/44008* (2013.01)

(58) Field of Classification Search
CPC ......... H04N 21/44012; H04N 21/4307; H04N 21/4318; H04N 21/438; H04N 21/44008;
(Continued)

(56) References Cited

U.S. PATENT DOCUMENTS 6,148,005 A * 11/2000 Paul ............... H04N 21/234327
                                              348/E7.071
6,233,283 B1 * 5/2001 Chiu .................... H04N 19/115
                                              375/E7.091
(Continued)

OTHER PUBLICATIONS

Pajak, et al., "Scalable Remote Rendering with Depth and Motion-flow Augmented Streaming", Eurographics, vol. 30 (2011), No. 2, Mar. 2011, pp. 1-10. (Year: 2011).*
(Continued)

*Primary Examiner* — Michael B. Pierorazio

(57) ABSTRACT

A server offloads graphics effects processing to a client device with graphics processing resources by determining a modification to a graphics effects operation, generating a portion of a rendered video stream using the modification to the graphics effects operation, and providing an encoded representation of the portion of the rendered video stream to the client device, along with metadata representing the modification implemented. The client device decodes the encoded representation to recover the portion of the rendered video stream and selectively performs a graphics effects operation on the recovered portion to at least partially revert the resulting graphics effects for the portion to the intended effects without the modification implemented by the server.

30 Claims, 5 Drawing Sheets

(51) Int. Cl.
*H04N 21/431* (2011.01)
*H04N 21/43* (2011.01)

(58) Field of Classification Search
CPC ......... H04N 21/43074; H04N 21/4312; H04N 21/4781; H04N 21/8146; H04N 21/23614
See application file for complete search history.

(56) References Cited

U.S. PATENT DOCUMENTS

| | | | | |
|---|---|---|---|---|
| 7,432,932 | B2* | 10/2008 | San | G06T 1/20 |
| | | | | 712/E9.055 |
| 7,849,491 | B2* | 12/2010 | Perlman | H04L 67/38 |
| | | | | 463/40 |
| 8,147,339 | B1* | 4/2012 | Perry | A63F 13/355 |
| | | | | 463/31 |
| 8,396,122 | B1* | 3/2013 | Taylor | H04N 19/436 |
| | | | | 375/240.03 |
| 8,500,558 | B2* | 8/2013 | Smith | A63F 13/355 |
| | | | | 463/31 |
| 8,537,899 | B1* | 9/2013 | Taylor | H04N 19/625 |
| | | | | 382/250 |
| 9,264,749 | B2* | 2/2016 | Wolman | H04N 21/234381 |
| 9,955,194 | B2* | 4/2018 | Wolman | H04N 21/6379 |
| 2004/0261113 | A1* | 12/2004 | Paul | H04N 21/234327 |
| | | | | 725/135 |
| 2009/0119736 | A1* | 5/2009 | Perlman | H04N 19/61 |
| | | | | 725/133 |
| 2009/0125961 | A1* | 5/2009 | Perlman | H04N 21/2385 |
| | | | | 725/112 |
| 2009/0125967 | A1* | 5/2009 | Perlman | H04N 19/154 |
| | | | | 725/133 |
| 2009/0144448 | A1* | 6/2009 | Smith | G09B 19/22 |
| | | | | 709/246 |
| 2010/0007582 | A1* | 1/2010 | Zalewski | A63F 13/00 |
| | | | | 345/8 |
| 2010/0167809 | A1* | 7/2010 | Perlman | H04L 65/605 |
| | | | | 463/43 |
| 2010/0273553 | A1* | 10/2010 | Zalewski | H04N 21/43074 |
| | | | | 463/31 |
| 2010/0285879 | A1* | 11/2010 | Huang | A63F 13/843 |
| | | | | 463/36 |
| 2010/0285883 | A1* | 11/2010 | Zalewski | G06F 3/0304 |
| | | | | 463/39 |
| 2010/0304868 | A1* | 12/2010 | Zalewski | A63F 13/24 |
| | | | | 463/38 |
| 2010/0306402 | A1* | 12/2010 | Russell | H04N 21/47205 |
| | | | | 709/230 |
| 2011/0086706 | A1* | 4/2011 | Zalewski | A63F 13/49 |
| | | | | 463/36 |
| 2011/0092291 | A1* | 4/2011 | Perlman | H04L 65/4076 |
| | | | | 463/40 |
| 2011/0118032 | A1* | 5/2011 | Zalewski | A63F 13/92 |
| | | | | 463/43 |
| 2011/0124410 | A1* | 5/2011 | Mao | G06F 3/0325 |
| | | | | 463/31 |
| 2011/0195782 | A1* | 8/2011 | Mao | A63F 13/214 |
| | | | | 463/37 |
| 2011/0216002 | A1* | 9/2011 | Weising | A63F 13/213 |
| | | | | 345/158 |
| 2011/0216060 | A1* | 9/2011 | Weising | G06T 7/20 |
| | | | | 345/419 |
| 2011/0260830 | A1* | 10/2011 | Weising | A63F 13/40 |
| | | | | 340/5.52 |
| 2011/0304713 | A1* | 12/2011 | Tardif | G06F 3/1423 |
| | | | | 348/54 |
| 2012/0258800 | A1* | 10/2012 | Mikhailov | A63F 13/285 |
| | | | | 463/36 |
| 2012/0306907 | A1* | 12/2012 | Huston | G06V 20/20 |
| | | | | 345/619 |
| 2012/0327113 | A1* | 12/2012 | Huston | H04W 4/021 |
| | | | | 345/632 |
| 2012/0331058 | A1* | 12/2012 | Huston | G06Q 30/0241 |
| | | | | 709/204 |
| 2013/0038618 | A1* | 2/2013 | Urbach | G06T 15/06 |
| | | | | 345/522 |
| 2013/0072301 | A1* | 3/2013 | Mallinson | A63F 13/211 |
| | | | | 463/36 |
| 2013/0106855 | A1* | 5/2013 | Urbach | G06T 15/08 |
| | | | | 345/424 |
| 2013/0132510 | A1* | 5/2013 | Ye | H04N 21/2343 |
| | | | | 709/217 |
| 2013/0178293 | A1* | 7/2013 | Nakayama | A63F 13/213 |
| | | | | 463/37 |
| 2013/0212162 | A1* | 8/2013 | Somadder | H04L 67/42 |
| | | | | 709/203 |
| 2013/0260896 | A1* | 10/2013 | Miura | H04N 21/4781 |
| | | | | 463/42 |
| 2013/0268573 | A1* | 10/2013 | Lee | H04N 21/44209 |
| | | | | 709/201 |
| 2013/0296052 | A1* | 11/2013 | Smith | A63F 13/31 |
| | | | | 463/31 |
| 2014/0173674 | A1* | 6/2014 | Wolman | H04N 21/23424 |
| | | | | 725/116 |
| 2016/0134907 | A1* | 5/2016 | Wolman | H04N 21/6131 |
| | | | | 725/116 |

OTHER PUBLICATIONS

"Graphic, adj. and n." OED Online. Oxford University Press, Sep. 2022. Web. Sep. 9, 2022. (Year: 2022).*
"Effect, n." OED Online. Oxford University Press, Sep. 2022. Web. Sep. 9, 2022. (Year: 2022).*

* cited by examiner

CLIENT-SIDE OFFLOAD OF GRAPHICS EFFECTS PROCESSING

CROSS-REFERENCE TO RELATED APPLICATIONS

The present application claims priority to U.S. Provisional Patent Application Ser. No. 62/985,924, filed on Mar. 6, 2020 and entitled "Exporting Graphics Effects That Are Not Readily Compressible to Client Device", the entirety of which is incorporated by reference herein.

BACKGROUND

In a typical cloud-based gaming system in which a data stream representing rendered video content is transmitted from a server to a client device, the server renders a sequence of video frames, applies corresponding (3D) graphics effects to the video frames during the rendering or as part of rendered-image post-processing, and then encodes the resulting video stream for transmission to the client device as a compressed bitstream. The client device, in turn, is left with simply decoding the compressed bitstream and displaying the resulting decoded video frame stream. However, some graphics effects that may be applied by the server may negatively impact the efficiency of the encoding and transmission processes, and thus may introduce undesirable latency issues, increased transmission bandwidth requirements, power consumption issues in the encoding and streaming processes.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

The introduction of certain graphics effects, and particularly three-dimensional (3D) graphics effects, by a server in a cloud gaming system or other rendered-video streaming system can introduce significant complexity into the encoding process, which results in excessive network bandwidth consumption, increased transmission latency, and increased power consumption at the server. Meanwhile, the client device that is receiving and decoding the encoded video stream, in some instances, has a graphics processing unit (GPU) or other graphics processing resources that are not being fully utilized during this process. To better balance the resource usage between server and client and to better utilize the network capacity connecting server to client device, systems, and techniques for adaptive offloading of graphics effects operations from server-side to client-side are described herein.

Figure 1:
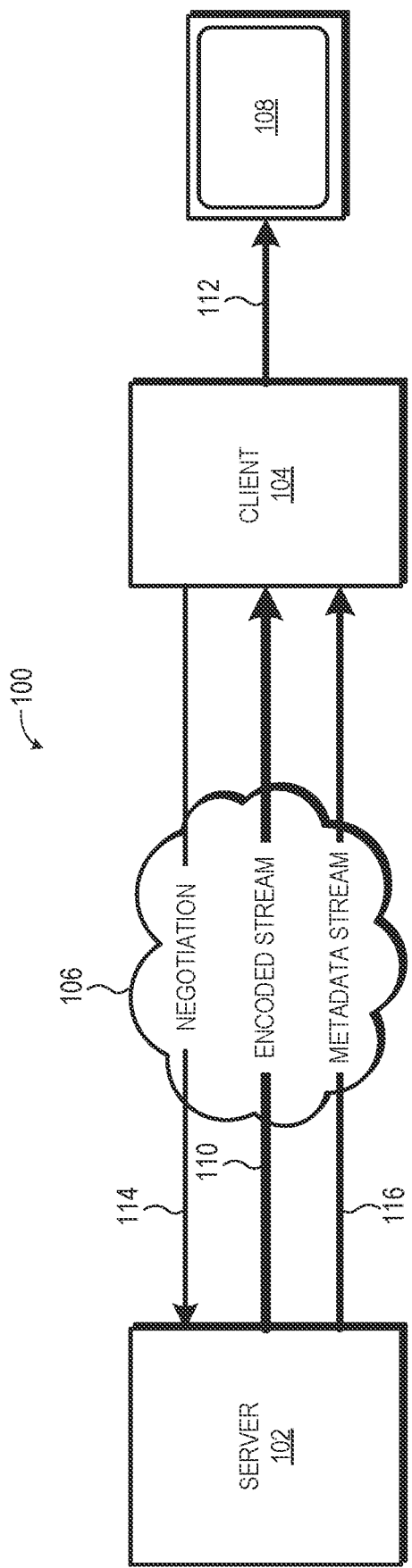
FIG. 1 is a block diagram of a cloud-based system employing adaptive offloading of graphics effects from server-side to client-side in accordance with some embodiments.

FIG. 1 illustrates a cloud-based system 100 employing graphics effects operation offloading in accordance with some embodiments. The system 100 includes a cloud service composed of one or more servers 102 connected to a client device 104 via one or more networks 106. The client device 104 in turn includes, or otherwise is connected to, a display device 108. The cloud service can include any of a variety of cloud-based services that provide streamed multimedia content to the client device 104. One example of such a service includes cloud-based video gaming, and the system 100 is described in further detail herein with reference to this example for ease of illustration. However, it will be appreciated that the techniques described herein are not limited to cloud-based video gaming services, but instead is implementable for any of a variety of systems in which a rendered video stream is remotely generated and encoded for transmission to the client device 104.

The one or more servers 102 of the cloud service comprise one or more servers co-located at the same server site or one or more servers located at geographically separated server sites. For purposes of illustration, the functionality implemented at the server-side of the system 100 is described in the context of a single server 102 performing the corresponding functionality. However, it will be appreciated that in some implementations, the functionality is distributed among multiple servers 102. The one or more networks 106 can comprise one or more wired or wireless wide area networks (WANs), such as the Internet, one or more wired or wireless local area networks (LANs), one or more cellular networks, or a combination thereof. The client device 104 can include any of a variety of user electronic devices used for receipt and display of encoded video streams, such as a laptop computer, desktop computer, tablet computer, smart phone, smart watch, video game console, vehicle entertainment system, network-connected appliance, and the like.

As a general operational interview, the server 102 operates to render a sequence of video frames, process this sequence to generate a stream of rendered video frames, concurrently encode the stream to generate an encoded stream 110 that is transmitted to the client device 104 via the one or more networks 106. As the encoded stream 110 is received, the client device 104 decodes the encoded stream 110 to recover the unencoded stream of rendered video frames and then provides a representation of the resulting stream 112 of rendered video frames for display at the display device 108. To illustrate, in a cloud-based gaming context, the server 102 executes an instance of a video game application that renders a stream of video frames based on gameplay controlled by user input received in parallel from the client device 104. This stream is encoded at the server 102, and the encoded video game video stream is transmitted to the client device 104 for decoding and display at the client device 104 and display device 108.

Video game applications or other applications that generate rendered graphical content and which are executed by the server 102 typically employ one or more 2D or 3D graphics effects implemented via execution of corresponding graphics effects operations. These graphics effects can include, for example, introduction of film grain noise, tone mapping, introduction of motion blurring, anti-aliasing, a bloom operation, a depth of field operation, a dynamic reflection operation, a supersampling operation, and the like. Often, application of these graphics effects increases the encoding complexity of the resulting rendered content. For example, application of a film grain noise operation to a rendered video frame typically increases the high-frequency content of the resulting modified video frame, and thus requires additional encoding compute effort and an increase in the resulting amount of encoded data needed to represent the modified video frame in the encoded stream 110. Both the increased encoding compute effort and increased encoding data output can lead to increased power consumption by the server 102 and further can cause additional latency and bandwidth consumption over the network 106, either of which can negatively impact the user's experience at the client device 104.

Accordingly, to mitigate the burden of employing graphics effects in the rendered video stream, in at least one embodiment the server 102 and the client device 104 employ an adaptive, selective offloading of the graphics effects burden from server-side to client-side. In this approach, one or more graphics operations that normally would be applied by the server 102 are modified in one or more ways according to a negotiation process performed between the server 102 and the client device 104 for purposes of configuring graphics effects offloading. In some implementations, this negotiation process includes the client device 104 providing a status advertisement 114 to the server 102, with the status advertisement 114 including one or more of: a representation of the availability of the graphics processing resources of the client device 104; one or more other parameters of the client device 104, such as thermal design power (TDP) or remaining battery life; or indications of a user experience expectations pertaining to image quality, latency, and the like. In response the server 102 makes offloading decisions based on this status information. In other implementations, the server 102 and the client device 104 actively communicates or otherwise negotiate the parameters of what graphics effects offloading the server 102 implements with respect to the client device 104.

Thereafter, during the rendering process that generates the stream of video frames that ultimately is encoded for transmission to the client device 104, the server 102 determines which one or more graphics effects operations to modify based on the negotiation, and in some embodiments, based on current server resource conditions or network conditions, and implements the determined graphics effects operation modifications. The modifications to the graphics effects operations implemented by the server 102 can include, for example, modification during the rendering process so that the corresponding graphics effects operation is modified to reduce complexity or the graphics effects operation is omitted entirely. Alternatively, the server can employ a post-processing stage in which certain graphics effects implemented during the rendering stage are modified to reduce complexity or removed entirely from the resulting video frame stream. The modifications to the graphics effects operations employed by the server 102 is implementable on any of a variety of granularity levels for the rendered image content, or combinations thereof. For example, a particular graphics effects operation is enabled or disabled on a frame-by-frame basis, whereas another graphics effects operation is scaled up or down in complexity on, for example, a slice-by-slice or block-by-block basis. The resulting rendered video frame stream is encoded and transmitted as encoded stream 110 to the client device 104.

This approach of changing one or more graphics effects operations employed by the server 102 for the outgoing rendered video frame stream reduces encoding complexity and thus can reduce processing effort at the server 102 and reduces the potential for excessive bandwidth consumption or latency in transmitting the resulting encoded stream 110. However, this also can reduce the overall implicit "quality" of the video stream as displayed at the client device 104 due to the diminished or entirely omitted graphics effects. In at least one embodiment, the system 100 compensates for this by at least partially reintroducing the missing graphics effects at the client device 104 using the graphics processing resources of the client device 104. To this end, the server 102 generates a metadata stream 116 and transmits the metadata stream 116 to the client device 104 via the one or more networks 106.

The metadata stream 116 contains metadata that reflects the modification(s) to the one or more graphics effects operations implemented by the server 102 in generating the encoded stream 110. For example, when the modification employed by the server for a corresponding graphics effects operation is to bypass (that is, omit) the use of the graphics effects operation entirely for one or more rendered frames, the metadata can include an indicator that the graphics effects operation was "turned off" for the corresponding rendered frames, or that the graphics effects operation was "turned on" for the other adjacent rendered frames. As another example, the subject graphics effects operation is a tone mapping operation, and the modification to the graphics effects operation employed by the server 102 includes the use of different parameters than a default parameter set (e.g., using a low dynamic range (LDR) range of [0, 127] instead of the default range of [0, 255]), and the metadata includes an indication that this reduced range was used instead of the default range. As yet another example, the subject graphics effects operation is a color grading operation, and the modification to the graphics effects operation employed by the server 102 includes a reduced amount or quality of color grading to improve compressibility, and the metadata then includes a representation of a different color transform that produces an increased amount or quality of color grading and which is selectively implemented by the client device 104 to recover the original image intent.

On the client side, the client device 104 receives the encoded stream 110 and the metadata stream 116 and processes the encoded stream 110 to generate the stream 112 of rendered video frames provided for display at the display device 108. This processing can include the aforementioned decoding of the encoded stream 110. Further, in at least one embodiment, this processing also can include selectively applying, based on the metadata stream 116, one or more graphics effects operations to the resulting decoded video frames prior to their output to the display device 108. This selectively process can include, for example, performing a graphics effects operation that was omitted by the server 102 for certain video frames or portions thereof, as identified by the metadata of the metadata stream 116. Another example includes the client device 104 performing a higher-quality version of a graphics effects operation that was performed at a lower-quality level by the server 102, as identified by the metadata of the metadata stream 116, or by performing an alternative graphics effects operation to the graphics effects operation that was omitted or downgraded by the server 102 as indicated in the metadata stream 116. Thus, the metadata in the metadata stream 116 provides hints, parameter data, or other guidelines that reflect how the server 102 bypassed or downgraded certain graphics effects operations so as to generate a rendered frame stream with lower encoding complexity, and therefore, in effect, allows the server 102 to offload the effort of implementing the graphics effects for the affected rendered content to a higher quality level onto the client device 104 and thus leverage the graphics processing resources at the client device 104 to provide rendered imagery of a targeted quality level to the user.

In some embodiments, this client-side graphics effects offloading is selectively implemented by the client device 104. For example, the client device 104 advertises its graphics processing capabilities, battery status, and other parameters to the server 102 without committing to using such capabilities, and the server 102 modifies one or more graphics effects operations applied to the outgoing encoded stream 110 such that the client device 104 can decode the encoded stream 110 to obtain a stream of decoded video frames of at least minimally sufficient quality in the event that the client device 104 elects not to apply any compensatory graphics effects operations to the decoded stream. In other embodiments, the client device 104 and the server 102 negotiate a specific resource commitment on the part of the client device 104, and the server 102 implements modifications to certain graphics effects that render the resulting stream of rendered frames of "insufficient" quality on their own, and thus requiring the client device 104 to apply certain compensatory graphics effects operations on the client side in accordance with its negotiated commitments in order to provide a decoded and processed stream of rendered video frames for display.

In addition to, or instead of, determining an offloading balance or graphics effects modification scheme based on client resource availability, in some embodiments the server 102 further includes an assessment of current network conditions of the network 106 and/or current processing bandwidth at the server 102 in determining the particular modification to one or more graphics effects operations to employ. For example, the server 102 scales tone mapping parameters up or down depending on changes in current network bandwidth capabilities or enable or disable a particular graphics effects operation entirely based on the current workload of the server 102.

Figure 2:
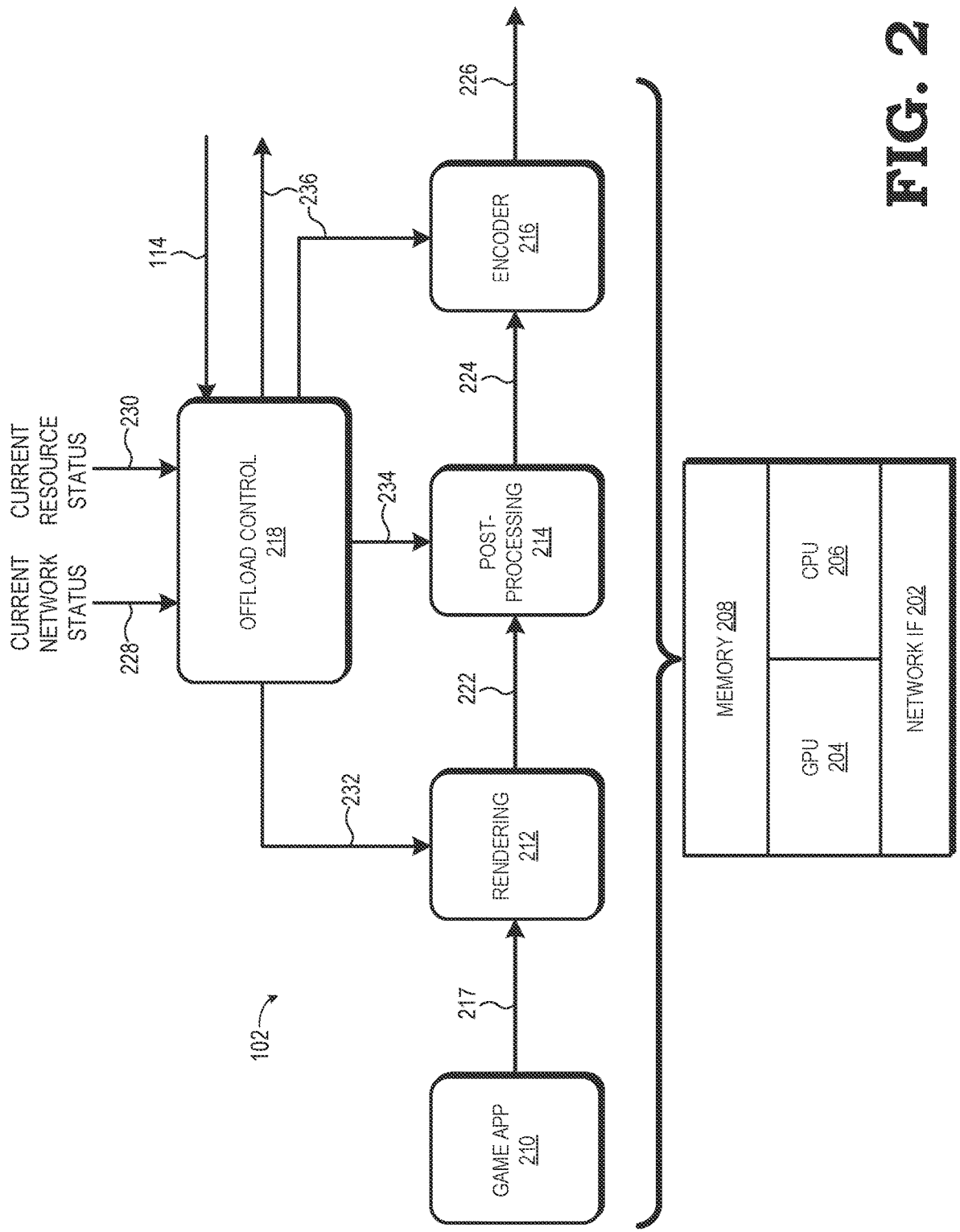
FIG. 2 is a block diagram illustrating an example implementation of a server of the system of FIG. 1 in accordance with some embodiments.

FIG. 2 illustrates an example configuration of the server 102 of the system 100 of FIG. 1 in accordance with some embodiments. In the depicted example, the hardware of the server 102 includes at least one network interface 202 to connect to the network 106, one or more processors, such as one or more GPUs 204 and one or more central processing units (CPUs) 206, and one or more computer-readable storage mediums 208, such as random-access memory (RAM), read-only memory (ROM), flash memory, hard disc drives, solid-state drives, optical disc drives and the like. For ease of reference, the computer-readable storage medium 208 is referred to herein as "memory 208". Further, although described in the singular, it will be appreciated that the functionality described herein with reference to memory 208 instead can be implemented across multiple storage mediums unless otherwise noted. Other hardware components, such as displays, input/output devices, interconnects and busses, and other well-known server components, are omitted for ease of illustration.

The one or more memories 208 of the server 102 are used to store one or more sets of executable software instructions and associated data that manipulate one or both of the GPU 204 and the CPU 206 and other components of the server 102 to perform the various functions described herein and attributed to the server 102. The sets of executable software instructions represent, for example, an operating system (OS) and various drivers (not shown), a video source application such as a video game application 210, a rendering stage 212, a post-processing stage 214, a video encoder 216, and an offload control module 218. As a general overview, the video game application 210 or other video source application is configured to generate a stream 217 of draw commands and related data representative of images or other video content of a video game scene or other representation of a view or perspective of a computer-generated scene. As such, the video source application typically is executed primarily by the CPU 206. The rendering stage 212 is configured to render a stream 222 of rendered video frames based on the stream 217 of draw commands and related data. The post-processing stage 214 is configured to perform one or more post-processing operations on the stream 222 of rendered video frames, which can include one or more graphics effects operations, to generate a processed stream 224 of rendered video frames. The encoder 216 is configured to encode (that is, compress) the processed stream 224 of rendered video frames using any of a variety of video encoding formats, such as Motion-Pictures Experts Group (MPEG) H.264 or H.265 (High-Efficiency Video Coding), or AOMedia Video 1 (AV1), to generate an encoded stream 226 for transmission to the client device 104 via the network interface 202. In some embodiments, one or more of the rendering stage 212, the post-processing stage 214, and the encoder 216 is implemented as part of a graphics driver for the GPU 204. The offload control module 218 is configured to manage the graphics effects offload processes for the server 102 as described herein, including offload negotiation with the client device 104, determination of which modifications to graphics effects operations to employ during the stream generation process, configuring one or both of the rendering stage 212 and post-processing stage 214 to implement the determined modifications, generation of the metadata reflecting the modifications employed, and providing the metadata as part of the metadata stream 116 via, for example, the encoder 216. The operation of these components is described in greater detail below with reference to FIG. 4.

Figure 3:
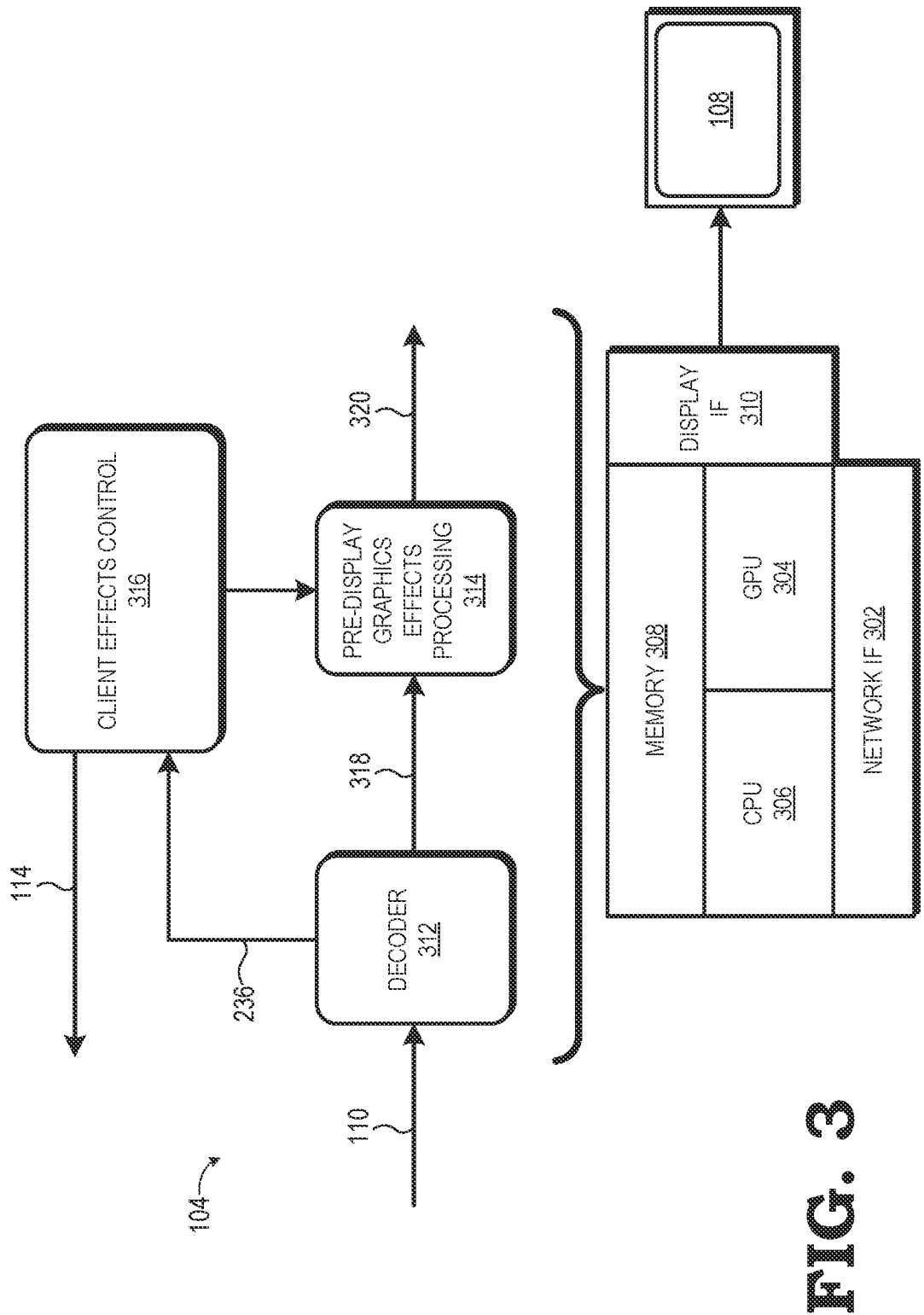
FIG. 3 is a block diagram illustrating an example implementation of a client device of the system of FIG. 1 in accordance with some embodiments.

FIG. 3 illustrates an example configuration of the client device 104 of the system 100 of FIG. 1 in accordance with some embodiments. In the depicted example, the hardware of the client device 104 includes at least one network interface 302 to connect to the network 106, one or more processors, such as one or more GPUs 304 and one or more CPUs 306, and one or more computer-readable storage mediums 308 (referred to herein as "memory 308" for ease of description), and a display interface 310 to interface with the display device 108. Other hardware components, such as displays, input/output devices, interconnects and busses, and other well-known client device components, are omitted for ease of illustration.

The one or more memories 308 of the client device 104 store one or more sets of executable software instructions and associated data that manipulate one or both of the GPU 304 and the CPU 306 and other components of the client device 104 to perform the various functions described herein and attributed to the client device 104. The sets of executable software instructions represent, for example, an OS and various drivers (not shown), a decoder 312, a pre-display graphics effects processing module 314, and a client effects control module 316. As a general overview, the decoder 312 receives the encoded stream 112 from the server 102 via the network 106 and the network interface 302 and decodes encoded stream 112 to generate a decoded stream 318 of rendered video frames that represents the processed stream 224 of rendered video frames output by the post-processing stage 214 of the server 102. The pre-display graphics effects processing module 314 performs one or more graphics effects operations on the image content of some or all of the decoded stream 318 to generate a display stream 320 of video frames for output to the display device 108 via the display interface 310. The client effects control module 316 of the client device 104 is configured to manage the graphics effects offload processes for the client device 104 as described herein, including offload negotiation with the server 102, extraction and processing of graphics-effects-related metadata from the metadata stream 116, determining which graphics effects operations, if any, to employ with the decoded stream 318 based on the metadata, and configuring one pre-display graphics effects processing module 314 to implement the determined graphics effects operations. The operation of these components is described in greater detail below with reference to FIG. 4.

Figure 4:
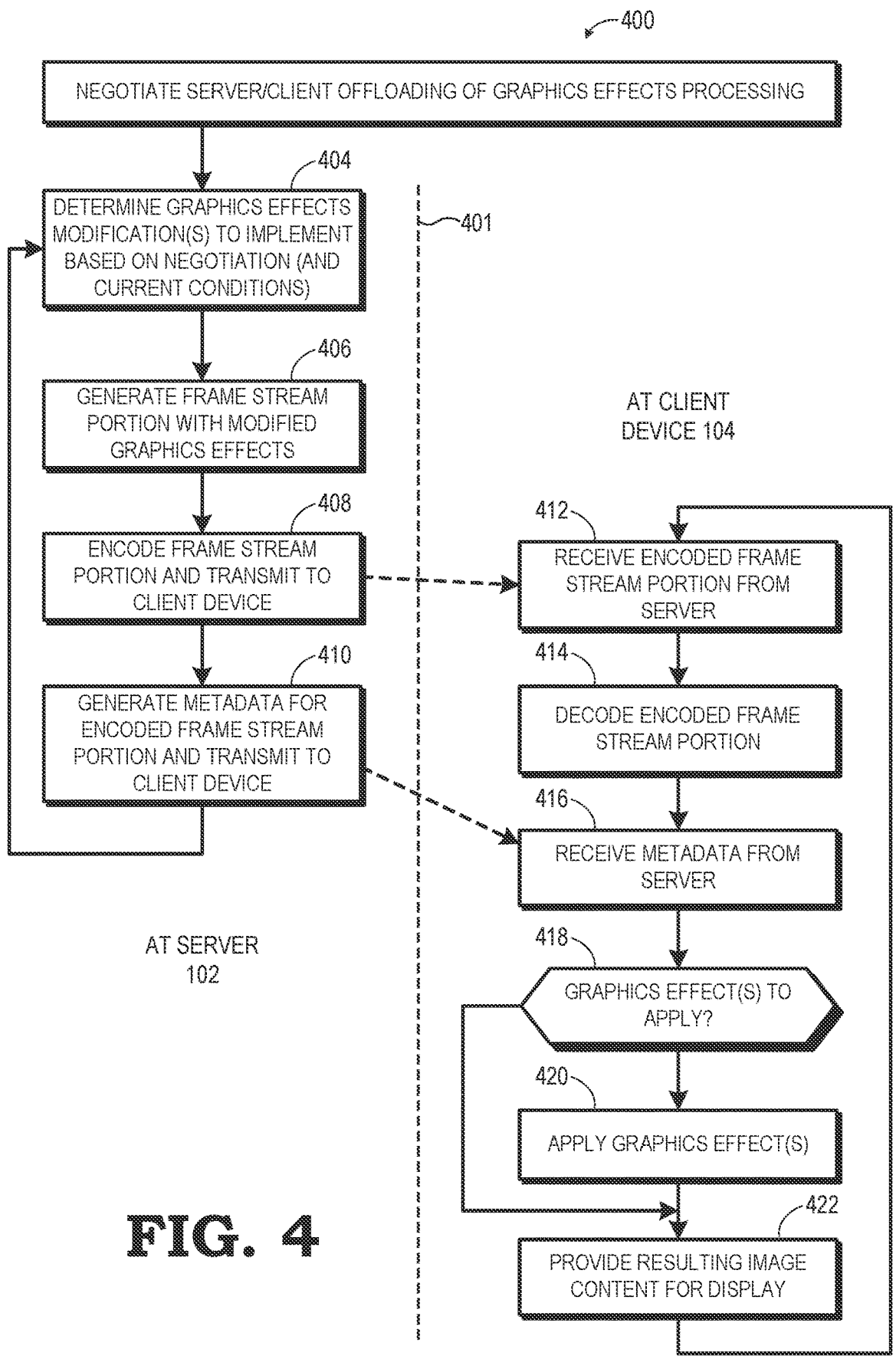
FIG. 4 is a flow diagram illustrating an example method for adaptive offloading of graphics effects operations in accordance with some embodiments.

FIG. 4 illustrates an example method 400 of joint operation of the server 102 and the client device 104 for rendered video stream with adaptive graphics effects offloading in accordance with some embodiments. For ease of illustration, the method 400 is described herein with reference to the example configuration of the server 102 as shown in FIG. 2 and to the example configuration of the client device 104 as shown in FIG. 3. However, the process of method 400 is not limited to these particular example configurations. Moreover, while the processes of method 400 are illustrated and described in a particular order, this order is for ease of description and it will be appreciated that certain processes can be performed in a different order or omitted entirely. Further, line 401 is used in FIG. 4 to identify those processes performed by the server 102 as being represented by blocks to the left of the line 401, and those processes performed by the client device 104 as being represented by blocks to the right of line 401.

Method 400 initiates at block 402 with an offloading negotiation process between the server 102 and the client device 104. This negotiation process can be one-sided, in that the client device 104 determines what graphics processing resources it currently has available (and that it is willing to allocate to offloaded graphics effects processing), and provides a status advertisement 114 representing the graphics processing resources the client device 104 is willing to commit to offloading. Thus, the status advertisement 114 can include an indication of whether the client device 104 has a GPU or other graphics-capable processor, the type/model of GPU and/or its current operating parameters (e.g., clock speed, cache size, etc.), an indication of whether graphics memory is available and the amount available, an indication of the types of graphics effects the GPU and its software can support and operational characteristics related thereto, and the like. In this approach, the client device 104 makes its capabilities know to the server 102 and allows the server 102 to decide the offloading strategy. In other implementations, the negotiation process is a bi-lateral negotiation process. In one such approach, the client device 104 advertises its processing capabilities to the server 102, the server 102 considers this information along with its own current graphics processing resources capacity, and proposes an offloading scheme to the client device 104. The client device 104 then can accept the proposed offloading scheme or transmit a counterproposal to the server 102, and so forth. For example, after considering the capabilities of the client device 104 and its own current operational status, the server 102 proposes to offload all image distortion operations (e.g., chromatic aberration effect operations) to the client device 104. The client device 104 evaluates this proposal and then may decline this offloading proposal in view of the resource-intensive processing required by the image distortion operations and user settings indicating that image distortion is disfavored. The server 102 then responds by proposing a different offloading approach, such as by offloading at least part of the burden of a different graphics effects operation. Alternatively, the client device 104 instead proposes that some initial image distortion processing be performed by the server 102, and final image distortion processing then be offloaded to the client device 104. The server 102 then in turn accepts this counterproposal or determines a different counterproposal of its own, and continue this negotiation process until a mutually-agreeable offloading strategy is identified.

At block 404, the offload control module 218 of the server 102 determines, based on the negotiation process of block 402, the particular modifications to make to one or more graphics effects operations that are to be employed for generating streaming video for the client device 104. This determination can rely on not only the client processing capabilities and/or the negotiated offload strategy but, in some embodiments, also rely on one or both of current network status information 228 (FIG. 2) obtained from the network interface 202 and current resource status information 230 (FIG. 2) obtained from one or both of the GPU 204 and the CPU 206 of the server 102. The current network status information 228 represents the current status of the one or more networks 106 related to their impact on the transmission of the encoded stream 110 from the server 102 to the client device 104, such as the current bandwidth, current latency, current packet drop rate, and the like. The current resource status information 230 represents the current status of the processing resources of the server 102 related to their impact on the ability of the server 102 to render, post-process, and/or encode a video stream, such as processor utilization, memory utilization, thermal status, power threshold status, and the like.

In instances in which the client device 104 advertised its capabilities without actively negotiating an offload strategy, the offload control module 218 utilizes the capabilities indicated in the status advertisement 114 from the client device 104, and in some embodiments, one or both of the current network status information 228 and current resource status information 230 to determine the particular one or more modifications to one or more graphics effects operations to be implemented. Generally, when the client device 104 has a greater amount of graphics processing resources available, the server 102 is able to offload a greater degree of graphics effects processing to the client device 104, and vice versa. Likewise, more network capacity and processing capacity available to the server 102 means less graphics effects are offloaded to the client device 104, and so forth. In instances in which a particular offloading strategy is negotiated between the client device 104 and the server 102, the offload control module 218 of the server 102 selects the one or more modifications to be made to the one or more graphics effects operations consistent with this negotiated offloading strategy. For example, if the strategy is to offload all image sharpening to the client device 104, the modification(s) to the graphics effects operations would result in the bypass of image sharpening operations at the server 102 in favor of image sharpening being applied at the client device 104.

As noted herein, a modification to a graphics effects operation selected by the offload control module 218 can include a modification to one or more parameters of the corresponding graphics effects operation. For example, if the burden of image sharpening is to be divided between the server 102 and the client device 104, rather than employ parameters that provide the full range of image sharpening at the server 102, the offload control module 218 can change the image sharpening parameters to as to implement a partial image sharpening operation at the server 102 (and include metadata in the metadata stream 116 that represents the image sharpening parameters that will need to be employed by the client device 104 to complete the image sharpening process at client side). In other situations, a modification to a graphics effects operation selected by the offload control module 218 can include enabling or disabling the graphics effects operation entirely for some portion or the entirety of the video frame stream. To illustrate, the default graphics effects for the video game application 210 can be for film grain noise to be applied to reach rendered frame before it is encoded, and the modification selected by the offload control module 218 can include disabling the film grain noise operation for one or more frames of the rendered video stream.

With the graphics effects operation modification(s) selected, at block 406 the server 102 generates a portion of a video frame stream based on the selected modification(s). This process can be implemented in any of at least three approaches. In a first approach, the outgoing video frame stream is originally rendered with the modification(s) to the graphics effects operation(s) already incorporated. For example, the rendering stage 212 renders each video frame (or slice, block, or other portion thereof depending on the granularity of the modification) of the stream with the modified graphics effects operation already implemented in the video frame (or other portion). Under this approach, the offload control module 218 provides control signaling 232 (FIG. 2) to the rendering stage 212 to direct the rendering stage 212 to implement the modification as part of the rendering process for the video frame or portion thereof. For example, if the modification is to bypass use of a particular graphics effects operation for a corresponding video frame, the control signaling 232 would signal this to the rendering stage 212, and in response, the rendering stage 212 would not perform the corresponding graphics effects operation while rendering the corresponding video frame. As another example, if the modification is to use modified parameters instead of default parameters for a given graphics effects operation, the control signaling 232 would provide an indication of the modified parameters to the rendering stage 212, which would then use these modified parameters in place of the default parameters when performing the graphics effects operation during the rendering of the corresponding video frame.

In a second approach, the rendering stage 212 renders an output video frame stream (e.g., stream 222) with the original, unmodified version of the graphics effects operations implemented, and then the post-processing stage 214 performs post-processing on this output video frame stream to implement the modification(s) to the graphics effects operation(s) selected at block 404 in the resulting processed stream 224 of video frames. For example, if the modification is to disable film grain noise for each video frame of a sequence of video frames, then the rendering stage 212 is controlled to render the video frames of this sequence with film grain noise included, and then the offload control module 218 controls the post-processing stage 214 to filter out the film grain noise from each frame of this sequence using control signaling 234 to generate the corresponding portion of the processed stream 224. As another example, if the modification is to switch to reduced-scale tone mapping (e.g., a range of [0, 127]) instead of the default full-scale tone mapping (e.g., a range of [0, 255]) for each slice of a frame, then the rendering stage 212 is controlled to render the slices of the video frame with full-scale tone mapping, and then the offload control module 218 controls the post-processing stage 214 to re-map each slide of the video frame to the reduced-scale range using control signaling 234 to generate the corresponding portion of the processed stream 224 that represents this processed slice.

In a third approach, the graphics effects operation modification(s) are implemented both during rendering and during post-rendering post-processing in a coordinated matter. For example, a first part of a particular modification is implemented during the original rendering and then a final part of the modification is implemented during the post-processing. As another example, one modification is implemented during rendering and another complementary modification is implemented during post-processing.

After the frame stream portion implementing the graphics effects operation modification(s) is generated (either during original rendering or as post-rendering processing), at block 408 the resulting frame stream portion is provided to the encoder 216, which encodes the frame stream portion to generate a corresponding bitstream portion that is then transmitted from the server 102 to the client device 104 as part of the encoded stream 226.

Concurrent with the frame stream portion generation and encoding processes of blocks 406 and 408 (although depicted as sequentially for ease of illustration), at block 410 the offload control module 218 generates metadata 236 (FIG. 2) that represents the graphics effects operation modification(s) implemented in the corresponding frame stream portion and provides the generated metadata 236 for transmission to the client device 104 as part of the metadata stream 116. As described below, this metadata can be used by the client device 104 to at least partially revert the graphics effects operation modifications (and in some instances, further augment the original graphics effects operation, and thus represents what modification(s) were implemented and, in some cases, contains the information needed to reverse the modifications at the client device 104. For example, if a graphics effects operation modification involves selectively activating or deactivating anti-aliasing on a frame-by-frame basis, the metadata 236 can include an indication of whether the corresponding frame or frames has anti-aliasing applied or not. As another example, if the graphics effects operation modification involves using a modified set of parameters for the corresponding graphics effects operation on a slice rather than default set of parameters for the slice, the metadata 236 for the slice could include a representation of the modified set of parameters, the default set of parameters, or a compensatory set of parameters that can be applied by the client device 104 in order to change the resulting graphics effects to how they would have appeared for the slice had the default set of parameters been originally used, exactly or approximately. To illustrate, the applied graphics effects operation can be a tone mapping operation that is applied on a slice-by-slice basis, with the tone mapping operation being modified in one manner for image slices representing a bright sky and in a different manner for image slices representing dark ground. That is, the metadata 236 can describe the actual graphics effects operation employed, the default graphics effects operation that was supposed to be applied, or guidelines for how to convert from the modified graphics effects operation to the full, unmodified graphics effects operation, depending on the particular operation or other circumstances.

The metadata 236, and the metadata stream 116 containing the metadata 236, can be provided from the server 102 to the client device 104 in any of a variety of ways. In some embodiments, the offload control module 218 provides the metadata 236 to the encoder 216, which encodes the metadata 236 and incorporates the encoded metadata 236 with other encoding metadata that is provided in a metadata layer of the output encoded stream 226, such as incorporating the metadata 236 into supplemental enhancement information (SEI) network abstraction layer (NAL) units of the resulting encoded bitstream as provided by the H.264 codec. In other embodiments, the metadata stream 116 is provided as a separate side stream, such as using a proprietary signaling format or conventional multi-stream transport mechanisms. Another iteration of the processes of blocks 404-410 is then repeated for the next frame stream portion to be generated, encoded, and transmitted to the client device 104.

Turning now to the client-side operations, at block 412 the client device 104 receives the encoded frame stream portion (portion of stream 110/encoded stream 226) generated at block 408 of the current iteration, and at block 414 the decoder 312 of the client device 104 decodes the encoded frame stream portion to generate the corresponding recovered (unencoded) frame stream portion. Concurrently (although depicted as sequentially for ease of illustration), at block 416 the client device 104 receives the metadata 236 corresponding to the received frame stream portion from the metadata stream 116. As noted above, the metadata 236 could be received via a separate proprietary or conventional side channel, or the metadata 236 could be encoded as part of the metadata container of the encoded stream 226, in which case the decoder 312 decodes and extracts the metadata 236 and provides it to the client effects control module 316 as part of the decoding process for the encoded frame stream portion.

At block 418, the client device 104 determines from the metadata 236 what graphics effects operation modification(s) were implemented by the server 102 and thus what further graphics effects processing could be applied to the decoded frame stream portion are indicated by the metadata 236. For example, as noted above, the metadata 236 may indicate that a certain graphics effects operation was bypassed for a set of frames in the current frame stream portion, and thus indicating that the client device 104 can perform the graphics effects operation for these frames. As another example, the metadata 236 may contain a representation or indication of the modified operation parameters employed by the server 102 or a representation or indication of the operation parameters the client device 104 is to use, and from this the client device 104 determines the graphics effects operation available to employ, and the parameters to use.

Further, in some instances, the client device 104 further determines whether to proceed with the application of the identified graphics effects operation(s). For example, in the one-sided negotiation approach in which the client device 104 advertises its available graphics processing resources but does not actively negotiate or commit to accepting an offload of graphics effects efforts, the server 102 may elect to bypass a particular graphics effects operation or use a "lower-quality" version of a graphics effects operation, and the client device 104 considers its current status and capabilities to determine whether to reintroduce the corresponding full or "high-quality" graphics effects operation on its end. To illustrate using an example in which the server 102 bypassed application of film grain noise for a frame, the client effects control module 316 may decide whether to apply the firm grain noise operation for the frame or continue without film grain noise for the frame based on, for example, the current bandwidth of the GPU 304 of the client device 104 or based on user-indicated preferences or prioritizations. Moreover, rather than apply the same graphics effects operation that was bypassed or modified by the server 102 in generating the frame stream portion, the client effects control module 316 instead may elect to apply an alternative graphics effects operation that differs from the bypassed/modified graphics effects operation at the server 102 but compensates for the bypassing/modification in one or more ways. For example, the original graphics effects operation intended to be implemented at the server 102 could include a computationally intense (and coding-inefficient) high-quality lens flare effect, and the modification could then be that the server 102 omits any lens flare effect. The client device 104 thus could elect to compensate for this modification (by omitting the effect entirely) by instead employing a less computationally intense and lower-quality version of a lens flare effect.

In the event that the server 102 has offloaded graphics effects for the frame stream portion and the client device 104 has elected to implement the offloaded graphics effects, at block 420 the client effects control module 316 provides control signaling 322 (FIG. 3) to the pre-display graphics effects processing module 314 to direct this module to implement the corresponding compensatory graphics effects operation on some or all of the frame stream portion. Depending on the manner of modification/offloading by the server 102, this can include implementing a graphics effects operation that was bypassed at the server 102 (or implementing its alternative), applying a final stage of an initial stage of a graphics effects operation that was applied at the server 102, and the like. Thereafter, at block 422 the client device 104 performs any final post-processing of the frame stream portion (e.g., frame resizing to fit the resolution and dimensions of the display device 108) and provides the resulting display data to the display device 108 for display. Another iteration of the processes of blocks 412-422 is then performed for the next encoded frame stream portion received from the server 102.

Figure 5:
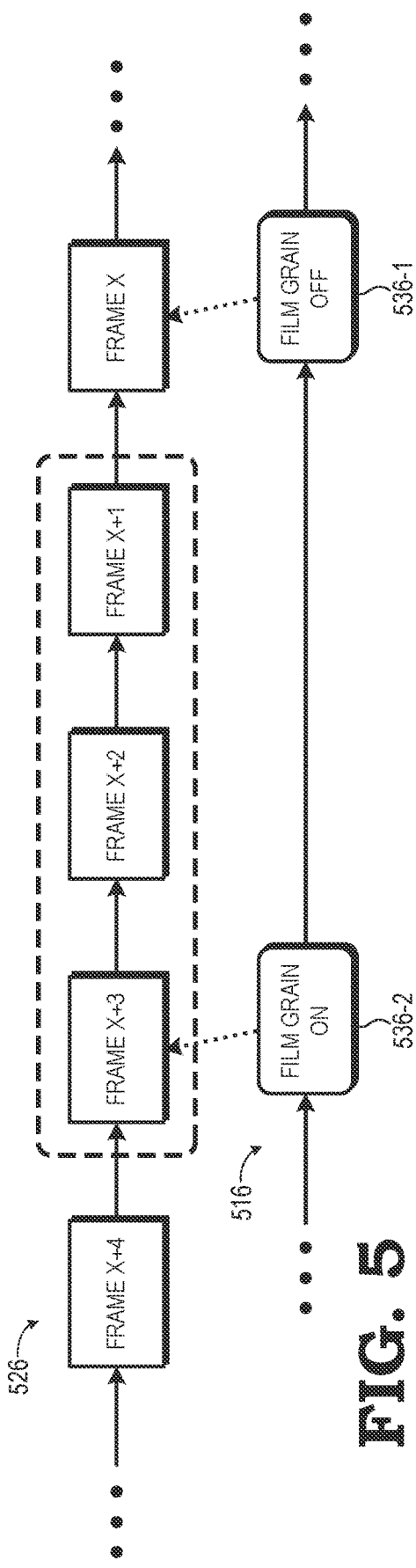
FIG. 5 is a block diagram illustrating an example metadata configuration for offloaded graphics effects in accordance with some embodiments.
Figure 6:
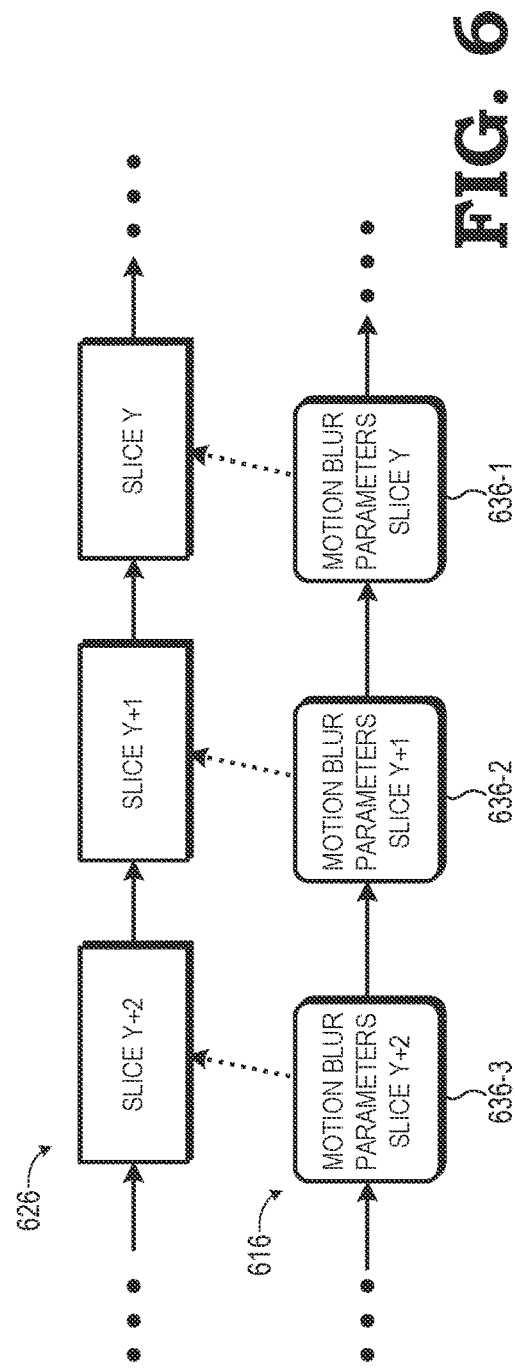
FIG. 6 is a block diagram illustrating another example metadata configuration for offloaded graphics effects in accordance with some embodiments.

Referring now to FIGS. 5 and 6, example metadata configurations are illustrated in accordance with some embodiments. FIG. 5 illustrates an implementation in which the metadata is used to signal when a corresponding graphics effects operation is selectively enabled or disabled for one or more portions of a video stream frame. In this particular example, an encoded frame stream 526 (one embodiment of encoded stream 226) is generated by the server 102 and received by the client device 104 and includes a sequence of five (5) frames, labeled frame X to frame X+4, with frame X being the first frame, timewise, in this sequence. Also in this example is a metadata stream 516 (one embodiment of metadata stream 116) having metadata 536-1 and 536-2. In this example, the server 102 applies a film grain nose operation to each generated frame by default. However, for frames X+1, X+2, and X+3, the server 102 implemented a graphics effects modification in that it bypassed application of film grain noise for these frames in response to, for example, a temporary reduction in network bandwidth that occurred while these frames were being processed at the server 102. Accordingly, the server 102 provides metadata 536-1 that contains data or another indication that signals to the client device 104 that film grain noise has been turned off for frame X+1 and any frames received thereafter until otherwise indicated. With receipt of metadata 536-1, the client device 104 is made aware that frames X+1, X+2, and X+3 do not incorporate film grain noise, and thus the client device 104 can elect to apply film grain noise to these frames to compensate for its original absence, and may apply the film grain noise according to server-supplied film noise effect parameters that are provided either as part of the negotiation process or as part of the metadata stream 116. For frame X+4, the server 102 has reverted to performing the film grain noise operation, and thus signals that it is no longer offloading the film grain noise operation by providing metadata 536-2 that includes data or another indication that signals to the client device 104 that film grain noise has been reactivated for frame X+4 and all subsequent frames until informed otherwise. In response, the client device 104 can cease the performance of the film grain noise operation for frame X+4 and subsequent frames. The metadata 536-1 and 426-2 can be associated with frame X+1 and X+4, respectively, using, for example, a frame identifier, a time stamp, and the like.

FIG. 6 illustrates an implementation in which the metadata is used to signal guidelines or other parameter-specific information on a portion-by-portion basis. In this example, an encoded frame stream 626 (one embodiment of encoded stream 226) is generated by the server 102 and received by the client device 104 and includes a sequence of 3 slices of a video frame, labeled slice Y to slice Y+2, with slice Y being the first slice, timewise, in this sequence. Also in this example is a metadata stream 616 (one embodiment of metadata stream 116) having metadata 636-1, 636-2, and 636-2 corresponding to slices Y, Y+1, and Y+2, respectively, and their correspondence indicated via a slice identifier, a timestamp, a position in a sequence, and the like. In this example, the server 102 applies a motion blur operation to each generated frame by default, but in the case of slices Y, Y+1, and Y+2 the server has applied a modified motion blur operation in which lower-quality parameters were applied so as to reduce encoding complexity for these slices.

Each of the metadata 636-1, 636-2, and 636-3 contains a representation of the motion blur parameters that the server 102 suggests or proposes for the client device 104 to use when performing an offloaded, compensatory motion blur operation on the corresponding slice. For example, the representation can include an identification of the original parameters that were to be applied, and the client device 104 can then use these particular parameters. As another example, the representation can include an identification of the modified parameters used by the server 102, and the client device 104 can determine compensatory parameters to be used during application of its own motion blur operation so as to revert the slice to a version that would have had the full motion blur effect had the server 102 applied the unmodified, default motion blur operation. Still further, the representation can include these compensatory parameters as calculated by the server 102, and thus leaving the client device 104 to apply the motion blur operation using the compensatory parameters and avoid requiring the client device to calculate the compensatory parameters itself.

In some embodiments, the systems, devices, and techniques described above are implemented in a system including one or more integrated circuit (IC) devices (also referred to as integrated circuit packages or microchips), such as the server and client device described above. Electronic design automation (EDA) and computer-aided design (CAD) software tools often are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device is stored in and accessed from the same computer-readable storage medium or a different computer-readable storage medium.

A computer-readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above is implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
determining, at a server, a modification to a graphics effects operation to be implemented by the server in generating a portion of a first stream of rendered video frames for encoding and transmission to a client device via at least one network, wherein the modification to the graphics effects operation to be implemented by the server comprises bypassing or downgrading one or more of a film grain noise operation, a tone mapping operation, a motion blurring operation, an anti-aliasing operation, a bloom operation, a depth of field operation, a dynamic reflection operation, a supersampling operation, a color grading operation, or an image sharpening operation; and
transmitting, from the server to the client device via the at least one network, metadata representing the modification to the graphics effects operation for the portion of the first stream.

2. The method of claim 1, wherein:
determining the modification to the graphics effects operation comprises determining a change to one or more parameters of the graphics effects operation that increases an encoding efficiency; and
the metadata includes a representation of the change to the one or more parameters.

3. The method of claim 1, wherein:
determining the modification to the graphics effects operation comprises selecting to bypass use of the graphics effects operation in generating the portion of the first stream; and
the metadata includes an indication that the graphics effects operation was bypassed in generating the portion of the first stream.

4. The method of claim 1, wherein generating the first stream of rendered video frames comprises performing a rendering process that uses the modification to the graphics effects operation to generate the portion of the first stream.

5. The method of claim 1, further comprising:
rendering, at the server, a portion of a second stream of rendered video frames using an unmodified version of the graphics effects operation; and
wherein generating the portion of the first stream comprises processing, at the server, the portion of the second stream of rendered video frames to modify, based on the modification to the graphics effects operation, a result of use of the unmodified version of the graphics effects operation present in the portion of the second stream to generate the portion of the first stream.

6. The method of claim 1, further comprising:
receiving, from the client device, client status information indicating one or more of an indication of graphics processing resources available at the client device, one or more current status parameters of the client device, and one or more indications of user experience expectations; and
wherein determining the modification to the graphics effects operation comprises determining the modification to the graphics effects operation based on the client status information.

7. The method of claim 6, wherein determining the modification to the graphics effects operation is further based on at least one of a current network status of the at least one network or a current resource status of the server.

8. The method of claim 1, wherein determining the modification to the graphics effects operation comprises determining the modification to the graphics effects operation based on a negotiation with the client device to identify one or more graphics effects operations that are available for at least partial offloading from the server to the client device.

9. The method of claim 1, the metadata includes an indication of one or more parameters for use by the client device during processing of the portion of the first stream to compensate for the modification to the graphics effects operation applied to the portion of the first stream.

10. A server comprising:
a network interface configured to couple to at least one network;
at least one processor coupled to the network interface; and
a memory coupled to the at least one processor, the memory storing executable instructions configured to manipulate the at least one processor to:
determine a modification to a graphics effects operation to be implemented by the at least one processor in generating a portion of a first stream of rendered video frames for encoding and transmission to a client device via the network interface, wherein the modification to the graphics effects operation to be implemented by the server comprises bypassing or downgrading one or more of a film grain noise operation, a tone mapping operation, a motion blurring operation, an anti-aliasing operation, a bloom operation, a depth of field operation, a dynamic reflection operation, a supersampling operation, a color grading operation, or an image sharpening operation; and
provide metadata representing the modification to the graphics effects operation for the portion of the first stream to the network interface for transmission to the client device.

11. The server of claim 10, wherein:
the executable instructions configured to manipulate the at least one processor to determine the modification to the graphics effects operation manipulate the at least one processor to determine a change to one or more parameters of the graphics effects operation that increases an encoding efficiency; and
the metadata includes a representation of the change to the one or more parameters.

12. The server of claim 10, wherein:
the executable instructions configured to manipulate the at least one processor to determine the modification to the graphics effects operation manipulate the at least one processor to select to bypass use of the graphics effects operation in generating the portion of the first stream; and
the metadata includes an indication that the graphics effects operation was bypassed in generating the portion of the first stream.

13. The server of claim 10, wherein the executable instructions configured to manipulate the at least one processor to generate the first stream of rendered video frames manipulate the at least one processor to perform a rendering process that uses the modification to the graphics effects operation to generate the portion of the first stream.

14. The server of claim 10, wherein the executable instructions further comprise executable instructions configured to manipulate the at least one processor to:
render a portion of a second stream of rendered video frames using an unmodified version of the graphics effects operation; and
wherein the executable instructions configured to manipulate the at least one processor to generate the portion of the first stream comprises executable instructions to manipulate the at least one processor to process the portion of the second stream of rendered video frames to modify, based on the modification to the graphics effects operation, a result of use of the unmodified version of the graphics effects operation present in the portion of the second stream to generate the portion of the first stream.

15. The server of claim 10, wherein the executable instructions further comprise executable instructions configured to manipulate the at least one processor to:
receive, from the client device, an indication of graphics processing resources available at the client device; and
wherein the executable instructions configured to manipulate the at least one processor to determine the modification to the graphics effects operation comprise executable instructions to manipulate the at least one processor to determine the modification to the graphics effects operation based on the indication of the graphics processing resources available at the client device.

16. The server of claim 15, wherein the executable instructions to manipulate the at least one processor to determine the modification to the graphics effects operation manipulate the at least one processor to determine the modification further based on at least one of a current network status of the at least one network or a current resource status of the server.

17. The server of claim 10, wherein the executable instructions to manipulate the at least one processor to determine the modification to the graphics effects operation manipulate the at least one processor to determine the modification to the graphics effects operation based on a negotiation with the client device to identify one or more graphics effects operations that are available for at least partial offloading from the server to the client device.

18. The server of claim 10, wherein the metadata includes an indication of one or more parameters for use by the client device during processing of the portion of the first stream to compensate for the modification to the graphics effects operation applied to the portion of the first stream.

19. A computer-implemented method comprising:
receiving, at a client device, an encoded representation of a portion of a first stream of rendered video frames from a server via at least one network;
receiving, at the client device, metadata from the server via the at least one network, the metadata including a representation of a modification to a graphics effects operation implemented by the server in generating the portion of the first stream, wherein the modification to the graphics effects operation implemented by the server comprises bypassing or downgrading one or more of a film grain noise operation, a tone mapping operation, a motion blurring operation, an anti-aliasing operation, a bloom operation, a depth of field operation, a dynamic reflection operation, a supersampling operation, a color grading operation, or an image sharpening operation;
decoding, at the client device, the encoded representation of the portion of the first stream to recover the portion of the first stream;
performing, at the client device, a graphics effects operation on the recovered portion of the first stream based on the modification to the graphics effects operation implemented by the server to generate a portion of a second stream of rendered video frames; and
providing the portion of the second stream for display at a display device associated with the client device.

20. The method of claim 19, wherein:
the metadata includes a representation of a change to one or more parameters of the graphics effects operation implemented by the server as the modification to the graphics effects operation; and
performing the graphics effects operation comprises performing the graphics effects operation with one or more parameters that compensate for the change to one or more parameters represented in the metadata.

21. The method of claim 19, wherein:
the metadata includes an indication that the graphics effects operation was bypassed by the server in generating the portion of the first stream; and
performing the graphics effects operation comprises performing one of the same graphics effects operation bypassed by the server or a graphics effects operation that is an alternative to, or compensates for, the graphics effects operation bypassed by the server.

22. The method of claim 19, further comprising:
negotiating, with the server, a strategy for offloading graphics effects processing to the client device.

23. The method of claim 22, wherein negotiating the strategy comprises:
providing, to the server, client status information indicating one or more of an indication of graphics processing resources available at the client device, one or more current status parameters of the client device, and one or more indications of user experience expectations.

24. The method of claim 19, wherein performing, at the client device, the graphics effects operation comprises selectively performing the graphics effects operation at the client device based on one or both of: a current status of one or more parameters of the client device and a user-indicated preference regarding the graphics effects operation.

25. A client device comprising:
a network interface configured to couple to at least one network;
at least one processor coupled to the network interface; and a memory coupled to the at least one processor, the memory storing executable instructions configured to manipulate the at least one processor to:

receive an encoded representation of a portion of a first stream of rendered video frames from a server via the network interface;

receive metadata from the server via the network interface, the metadata including a representation of a modification to a graphics effects operation implemented by the server in generating the portion of the first stream, wherein the modification to the graphics effects operation implemented by the server comprises bypassing or downgrading one or more of a film grain noise operation, a tone mapping operation, a motion blurring operation, an anti-aliasing operation, a bloom operation, a depth of field operation, a dynamic reflection operation, a supersampling operation, a color grading operation, or an image sharpening operation;

decode the encoded representation of the portion of the first stream to recover the portion of the first stream;

perform a graphics effects operation on the recovered portion of the first stream based on the modification to the graphics effects operation implemented by the server to generate a portion of a second stream of rendered video frames; and provide the portion of the second stream for display at a display device associated with the client device.

26. The client device of claim 25, wherein:

the metadata includes a representation of a change to one or more parameters of the graphics effects operation implemented by the server as the modification to the graphics effects operation; and the executable instructions to manipulate the at least one processor to perform the graphics effects operation manipulate the at least one processor to perform the graphics effects operation with one or more parameters that compensate for the change to one or more parameters represented in the metadata.

27. The client device of claim 25, wherein:

the metadata includes an indication that the graphics effects operation was bypassed by the server in generating the portion of the first stream; and the executable instructions to manipulate the at least one processor to perform the graphics effects operation manipulate the at least one processor to perform one of the same graphics effects operation bypassed by the server or a graphics effects operation that is an alternative to, or compensates for, the graphics effects operation bypassed by the server.

28. The client device of claim 25, wherein the executable instructions further are configured to manipulate the at least one processor to:

negotiate, with the server, a strategy for offloading graphics effects processing to the client device.

29. The client device of claim 28, wherein the executable instructions configured to manipulate the at least one processor to negotiate the strategy manipulate the at least one processor to provide, to the server, client status information indicating one or more of an indication of graphics processing resources available at the client device, one or more current status parameters of the client device, and one or more indications of user experience expectations.

30. The client device of claim 25, wherein the executable instructions configured to manipulate the at least one processor to perform the graphics effects operation manipulate the at least one processor to selectively perform the graphics effects operation based on one or both of: a current status of one or more parameters of the client device and a user-indicated preference regarding the graphics effects operation.

* * * * *